United States Patent [19]

Cawlfield

[11] Patent Number: 4,590,058

[45] Date of Patent: May 20, 1986

[54] PROCESS FOR PRODUCING HIGH PURITY SOLUTIONS OF ALKALI METAL HYDROSULFITES

[75] Inventor: David W. Cawlfield, Cleveland, Tenn.

[73] Assignee: Olin Corporation, Cheshire, Conn.

[21] Appl. No.: 703,780

[22] Filed: Feb. 21, 1985

[51] Int. Cl.[4] ............................................. C01B 17/66
[52] U.S. Cl. .................. 423/515; 252/188.2; 23/296
[58] Field of Search ............... 423/560, 575, 514, 516, 423/512; 23/296; 252/188.22

[56] References Cited

U.S. PATENT DOCUMENTS

| | | | |
|---|---|---|---|
| 2,938,771 | 5/1960 | Avedikian | 23/116 |
| 3,298,796 | 1/1967 | Van Damme-Van Weele et al. | 23/302 |
| 3,804,944 | 4/1974 | Kise et al. | 423/265 |
| 3,839,218 | 10/1974 | Owen et al. | 423/515 |
| 3,887,695 | 6/1975 | Plentovich et al. | 423/515 |
| 3,961,034 | 6/1976 | Bostian et al. | 423/181 |
| 4,042,674 | 8/1977 | Yamamoto et al. | 423/515 |
| 4,076,795 | 2/1978 | Tiethof | 423/515 |
| 4,100,098 | 7/1978 | Magan | 423/515 |
| 4,126,716 | 11/1978 | Yamamoto et al. | 423/515 |
| 4,283,303 | 8/1981 | Ellis | 423/515 |
| 4,357,256 | 11/1982 | Yamaguchi | 423/515 |
| 4,388,291 | 6/1983 | Arakawa | 423/515 |
| 4,534,954 | 8/1985 | Little et al. | 423/515 |

FOREIGN PATENT DOCUMENTS 0110406 7/1983 Japan ................................. 423/515

*Primary Examiner*—John Doll
*Assistant Examiner*—Anthony McFarlane
*Attorney, Agent, or Firm*—James B. Haglind; Thomas P. O'Day

[57] ABSTRACT

High purity solutions of alkali metal hydrosulfites having low concentrations of alkali metal thiosulfates are produced in a process which comprises feeding an alcohol-free aqueous solution of an alkali metal hydrosulfite containing an alkali metal thiosulfate as an impurity to a crystallizing zone. Produced in the crystallizing zone is a slurry of alkali metal hydrosulfite crystals which is conveyed from the crystallizing zone to a separating zone. The separating zone, employing a non-gravitational separation means, recovers a slurry of alkali metal hydrosulfite crystals from a first mother liquor. A portion of the slurry of alkali metal hydrosulfite crystals is conveyed to a concentrating zone to recover a cake of alkali metal hydrosulfite crystals from a second mother liquor. The cake of alkali metal hydrosulfite hydrate crystals is admixed with water in a dissolving zone to produce a purified solution of an alkali metal hydrosulfite having reduced concentrations of said alkali metal thiosulfate as an impurity.

The process is operated to minimize the residence time of alkali metal hydrosulfite containing mother liquors in the crystallizing zone and prevent significant decomposition of the crystals of alkali metal hydrosulfite.

19 Claims, No Drawings

PROCESS FOR PRODUCING HIGH PURITY SOLUTIONS OF ALKALI METAL HYDROSULFITES

This invention relates to a process for producing alkali metal hydrosulfite solutions. More specifically, this invention relates to a process for producing alkali metal hydrosulfite solutions containing reduced amounts of undesirable impurities.

Alkali metal hydrosulfites are commercially available bleaching agents which are particularly suitable for use in the textile and clay industries. While available in the anhydrous form, they are advantageously used as a solution. Industrial processes which produce solutions of alkali metal hydrosulfites for bleaching applications also form, as an undesirable impurity, an alkali metal thiosulfate in concentrations which are detrimental to the stability of the solutions, for example, during storage. The presence of significant amounts of thiosulfate ion in stabilized alkaline hydrosulfite solutions is believed to promote decomposition of the hydrosulfite ions. Therefore it is economically important to reduce the thiosulfate concentration of commercially produced alkali metal hydrosulfite solutions to insignificant levels. Sulfite impurities are also present in these solutions which are detrimental to bleaching applications in which the total salt content is to be minimized. In reactions from which alkali metal hydrosulfite solutions are produced, alkali metal sulfite and alkali metal bisulfite are raw materials, therefore it is economically advantageous to remove these impurities from the product solution and recycle them to the reactor.

One method of removing thiosulfate ions from alkali metal hydrosulfite solutions is to contact the solutions with an ion exchange resin which absorbs the thiosulfate ion as described, for example, in U.S. Pat. No. 3,961,034, issued June 1, 1976 to L. C. Bostian et al. This method is limited by the low selectivity of currently available ion exchangers for ions over hydrosulfite ions. Thus frequent (costly) regeneration, and limited purity are disadvantages of this method. In addition, sulfite and bisulfite ions are not absorbed by the ion exchange resin.

Another process which has been employed is the crystallization of an aqueous solution of alkali metal hydrosulfite containing an alcohol, such as methanol or ethanol, which reduces the solubility of the hydrosulfite compound. One example of this approach is described in U.S. Pat. No. 3,298,796, issued Jan. 17, 1967 to M. A. van Damme-van Weele et al. In this process, a dilute solution of sodium hydrosulfite is admixed with 20% ethanol and the solution crystallized in a vacuum crystallizer in the presence of a thick suspension of sodium dihydrate crystals. In addition to requiring the crystallization to take place under vacuum conditions, the mother liquor recovered contains an alcohol which may have to be removed before recycling the mother liquor to the process for producing the hydrosulfite solution.

A similar process is taught by S. Z. Avedikian in U.S. Pat. No. 2,938,771, published May 31, 1960, where a hydrosulfite rich solution containing an alcohol is crystallized.

Both U.S. Pat. Nos. 3,298,796 and 2,938,771 teach a separation of a slurry of hydrosulfite crystals in thickener in which a filtrate is returned to the reactors and the thickened crystal slurry fed to a centrifuge with a portion being returned to the crystallizer.

The use of alcohol in these processes suppresses the solubility of alkali metal hydrosulfites as well as the size of the hydrosulfite crystals produced. These crystals are more difficult to separate from the mother liquor. Extending the period of contact between the crystals and the alkali metal thiosulfate-containing liquors during separation results in excessive hydrosulfite decomposition and increased thiosulfate concentrations. Further, where an alkali metal amalgam is used in the hydrosulfite process, contamination of the amalgam with alcohol renders the amalgam unsuitable for use in other electrolytic processes.

Therefore, there is a need for an improved process for the production of purified alkali metal hydrosulfite solutions which significantly reduces the concentration of impurities such as an alkali metal thiosulfate and alkali metal sulfites while avoiding the addition of solvents and suppressants which contaminate the mother liquor.

It is an object of the invention to provide a process for the production of high purity solutions of an alkali metal hydrosulfite.

Another object of the present invention is to provide a process for the production of high purity solutions of an alkali metal hydrosulfite which minimizes decomposition of the solutions during processing.

A further object of the present invention is to provide a process for the production of high purity solutions of an alkali metal hydrosulfite in which crystals of alkali metal hydrosulfites are produced while minimizing their contact with impure mother liquors.

These and other objects of the invention are accomplished in a process for the production of high purity solutions of an alkali metal hydrosulfite which comprises:

(a) feeding an alcohol-free aqueous solution of an alkali metal hydrosulfite containing an alkali metal thiosulfate as an impurity to a crystallizing zone, (b) producing a slurry of alkali metal hydrosulfite crystals in the crystallizing zone, (c) conveying the slurry of alkali metal hydrosulfite crystals from the crystallizing zone to a separating zone, (d) separating in the separating zone employing a non-gravitational separation means a slurry of alkali metal hydrosulfite crystals from a first mother liquor, (e) conveying a portion of the slurry of alkali metal hydrosulfite crystals to a concentrating zone to recover a cake of alkali metal hydrosulfite crystals from a second mother liquor, and (f) admixing the cake of alkali metal hydrosulfite hydrate crystals with water in a dissolving zone to produce a purified solution of an alkali metal hydrosulfite having reduced concentrations of alkali metal thiosulfate as an impurity.

Aqueous solutions of alkali metal hydrosulfites such as sodium hydrosulfite or potassium hydrosulfite are produced commercially, for example, by the reaction of sulfur dioxide gas, alkali metal sulfites, or alkali metal bisulfites with alkali metal amalgams. These solutions can also be produced electrochemically or in reduction processes employing hydrogen or anthraquinone. An undesirable by-product formed in these processes is an alkali metal thiosulfate. As the alkali metal thiosulfate is more soluble in water than the alkali metal hydrosulfite, it is possible to separate these compounds by crystallizing the alkali metal hydrosulfite. In addition, the hydrosulfite product solution contains alkali metal sulfites and alkali metal bisulfites which are also more soluble in water than the alkali metal hydrosulfites and which are advantageously recovered to be recycled to the production process. However, the decomposition rate of alkali metal hydrosulfite solutions precludes the use of the crystallizing processes of the prior art in which the hydrosulfite crystals remain in contact with the thiosulfate containing liquor for extended periods of time. Their employment, without the addition of an alcohol as a suppressant, results in the decomposition of more than 10% of the product during the crystallization step. Further, the crystal growth rate for alkali metal hydrosulfite crystals such as sodium hydrosulfite dihydrate is very slow and the processes of the prior art require a long residence time.

Applicant's novel process for producing high purity alkali metal hydrosulfite solutions, which for the sake of simplicity will be described in terms of sodium hydrosulfite as the alkali metal hydrosulfite, employs as a starting material, a solution of sodium hydrosulfite having undesirable concentration levels of sodium thiosulfate. The solution, which is free of alcohols such as methanol or ethanol, is fed to a crystallizing zone where it is cooled below the saturation point to form crystals of sodium hydrosulfite dihydrate. Suitable as crystallizing zones are, for example, mixed tank crystallizers and column crystallizers.

The crystallizing zone is operated at temperatures in the range of from about −5° to about +10° C., preferably from about −1° to about +4° C., to produce needle shaped sodium hydrosulfite dihydrate crystals. The residence time of the crystals in the crystallizing zone is from about 30 minutes to about 240 minutes, and preferably from about 60 minutes to about 120 minutes. A sodium hydrosulfite dihydrate slurry is produced in the crystallizing zone having at least about 10, preferably from about 15 to about 25 percent by weight of crystals. The crystallizing zone is operated to maintain supersaturation in the solution at below about 5 grams per liter, for example, at from about 1 to about 3 grams per liter. Further, the residence time for the mother liquor in the crystallizing zone is to be less than 60 minutes, preferably less than 40 minutes and more preferably from about 10 to about 20 minutes.

To accomplish this, the slurry of crystals is continuously conveyed to a separation zone employing non-gravitational means for separating sodium hydrosulfite dihydrate crystals from the mother liquor. The rate of removal of the slurry of crystals is greater than one time the volume of the crystallizer per hour, and preferably at least three times the volume of the crystallizer per hour. Rotary filters, centrifuges including solid bowl centrifuges, pusher centrifuges, basket centrifuges and hydrocyclones are examples of suitable separating means. The non-gravitational separating means rapidly removes crystals of sodium hydrosulfite dihydrate from the mother liquor. The major portion of these crystals, for example, at least 80 percent, is returned to the crystallizing zone and a minor portion of product sized crystals is conveyed to a concentrating zone.

In a preferred embodiment, the slurry of crystals from the crystallizer is conveyed to at least two non-gravitational separating zones. In the first separating zone the larger crystals of sodium hydrosulfite dihydrate are rapidly removed from the slurry and returned to the crystallizing zone or the concentrating zone. The suspension of remaining sodium hydrosulfite dihydrate crystals is conveyed to a supplementary separating zone and sodium hydrosulfite dihydrate crystals of a size greater than about 5 microns are rapidly separated from a mother liquor and returned to the crystallizing zone. The separating zones are operated to maintain overflow to underflow ratios of from about 1:1 to about 2:1. A preferred embodiment of the first and supplementary separating zones is a hydrocyclone.

The mother liquor, containing reduced concentrations of sodium hydrosulfite, is returned to a reaction zone for producing the sodium hydrosulfite solution fed to the crytallizing zone. Prior to feeding the sodium hydrosulfite mother liquor to the reaction zone, the mother liquor may be heated to dissolve any fine crystals of sodium hydrosulfite dihydrate present.

A slurry or portion thereof of suitably sized crystals of sodium hydrosulfite dihydrate from the non-gravitational separating zone is conveyed to a concentrating zone to provide a cake of sodium hydrosulfite dihydrate crystals. The concentrating zone may employ any suitable concentration means such as a centrifuge, hydrocyclone, or filter.

The concentrating zone produces a cake of sodium hydrosulfite dihydrate crystals and a sodium hydrosulfite mother liquor. The crystalline cake has a moisture content of less than about 50 percent by weight. Sodium hydrosulfite mother liquor from the concentrating zone is recycled, for example, to the crystallizing zone.

The cake of sodium hydrosulfite dihydrate crystals is conveyed from the concentrating zone to a dissolving zone in which it is admixed with water. Sufficient water is added to maintain the concentration of the purified solution of sodium hydrosulfite product in the range of from about 8 to about 15 percent, preferably from about 11 to about 13 percent, and more preferably from about 11.5 to about 12.5 percent by weight. To provide improved stability to the purified product, a stabilizing amount of an aqueous solution of a stabilizing agent such as an alkali metal hydroxide or an alkali metal carbonate compound is added. Suitable stabilizing amounts are those in the range of from about 0.1 to about 1.0 percent by weight of the stabilizing agent. The high purity solution of sodium hydrosulfite produced in the dissolving zone has reduced concentrations of sodium thiosulfate as well as other components such as sodium bisulfite and sodium sulfite. The concentration of thiosulfate ion in the high purity product solution is less than about 0.7 percent by weight and preferably less than about 0.5 percent by weight.

In the continuous operation of the process, the mother liquor from the crystallizing zone containing reduced concentrations of sodium hydrosulfite may be returned to the first reaction zone for producing additional sodium hydrosulfite solution to be fed to the crystallizing zone. Preferably, a portion of this mother liquor is fed to a second reaction zone for the production of sodium hydrosulfite solution with the remaining portion fed to the first reaction zone.

The novel process of the present invention is illustrated by the following examples with no intention of being limited thereby. All parts and percentages are by weight unless otherwise indicated.

EXAMPLE 1

A solution of sodium hydrosulfite (150 grams per liter, g/l) containing 16.2 g/l of sodium thiosulfate (1.36% by weight), 18.5 g/l of sodium sulfite and 75.4 g/l of sodium bisulfite was continuously fed to a nonagitated crystallizing tank (1150 liter, 0.9 meter diameter) and cooled in a heat exchanger to about 0° C. to form a slurry containing 13% by weight of sodium hydrosulfite dihydrate crystals. The slurry was conveyed to a first series of hydrocyclones at a rate greater than three times the volume of the crystallizing tank. The hydrocyclones separated as the underflow crystals of sodium hydrosulfite dihydrate larger than about 25 microns from a suspension of smaller sodium hydrosulfite crystals as the overflow. A recycle portion of the underflow was returned to the crystallizer and a product portion conveyed to a centrifuge. The suspension overflow from the first series of hydrocyclones was fed at a rate of about 57 liters per minute to a supplementary series of hydrocyclones in which an underflow slurry of sodium hydrosulfite dihydrate crystals larger than about 5 microns was rapidly removed from an overflow mother liquor. The underflow slurry from the supplementary series of hydrocyclones was conveyed at a rate of about 38 liters per minute to the crystallizer. The overflow mother liquor from the supplementary hydrocyclone series, containing 125.2 g/l sodium hydrosulfite, 16 g/l sodium thiosulfate, 30.4 g/l sodium sulfite, and 64.6 g/l sodium bisulfite was returned to the reactor producing the sodium hydrosulfite feed solution.

A centrifuge, containing the product portion of sodium hydrosulfite dihydrate crystals from the first hydrocyclone series, was operated to produce a concentrated cake of sodium hydrosulfite dihydrate crystals containing 40 percent by weight of moisture and a centrifuge mother liquor. The centrifuge mother liquor was returned to the crystallizer.

The concentrated cake of sodium hydrosulfite dihydrate crystals was conveyed to a dissolving tank and admixed with water and a stabilizing amount of a 20 percent aqueous solution of sodium hydroxide at 20° C. The high purity product solution produced contained 132.3 g/l sodium hydrosulfite, 4.1 g/l sodium thiosulfate (0.36% by weight), and 9.9 g/l sodium sulfite at a density of 1.130 g/c.c.

EXAMPLE 2

The process of EXAMPLE 1 was run continuously with a sodium hydrosulfite solution feed containing 144.8 g/l of $Na_2S_2O_4$, 11.6 g/l of sodium thiosulfate, 23.8 g/l of sodium sulfite, and 81.1 g/l of sodium bisulfite. The hydrosulfite solution was fed at a rate of 12 gallons per minute to the crystallizer of EXAMPLE 1 to produce a slurry of sodium hydrosulfite dihydrate crystals which was continuously fed to the hydrocyclone series. Product sized crystals were continuously conveyed to the centrifuge at a rate of 1.4 gallons per minute. After dissolving the crystalline cake recovered from the centrifuge, a product solution containing 130.4 g/l of sodium hydrosulfite, and 4.1 g/l of sodium thiosulfate was continuously recovered.

EXAMPLE 3

The process of EXAMPLE 1 was run continuously to produce a product containing 151.2 g/l sodium hydrosulfite, 4.6 g/l of sodium thiosulfate, 32.8 g/l of sodium sulfite, and 6.3 g/l of sodium hydroxide. This product was placed into a storage tank under an inert atmosphere and maintained at 15° C. The product solution, stored for 28 days, retained a $Na_2S_2O_4$ concentration which remained above 150 g/l.

What is claimed is:

1. A process for the production of high purity solutions of an alkali metal hydrosulfite which comprises:
   (a) feeding an alcohol-free aqueous solution of an alkali metal hydrosulfite containing at least 1% by weight of an alkali metal thiosulfate as an impurity to a crystallizing zone,
   (b) producing a slurry of alkali metal hydrosulfite hydrate crystals in said crystallizing zone,
   (c) conveying said slurry of alkali metal hydrosulfite hydrate crystals from said crystallizing zone to a separating zone at a rate greater than one times the volume of said crystallizing zone per hour,
   (d) separating in a separating zone employing a nongravitational separation means a slurry of alkali metal hydrosulfite hydrate crystals from a first mother liquor,
   (e) conveying a portion of said slurry of alkali metal hydrosulfite hydrate crystals to a concentrating zone to recover a cake of alkali metal hydrosulfite hydrate crystals from a second mother liquor, and
   (f) admixing the cake of alkali metal hydrosulfite hydrate crystals with water in a dissolving zone to produce a purified solution of an alkali metal hydrosulfite having reduced concentrations of said alkali metal thiosulfate of less than 0.7% by weight as an impurity.

2. The process of claim 1 in which said crystallizing zone is maintained at a temperature of from about −5° to about +10° C.

3. The process of claim 2 in which the residence time for said alkali metal hydrosulfite hydrate crystals in said crystallizing zone is from about 30 to about 240 minutes.

4. The process of claim 3 in which said slurry of alkali metal hydrosulfite hydrate crystals in said crystallizing zone contains at least about 10 percent by weight of crystals.

5. The process of claim 4 in which supersaturation in said crystallizing zone is maintained at less than about 5 grams per liter.

6. The process of claim 5 in which said purified solution of alkali metal hydrosulfite has a thiosulfate ion concentration of less than about 0.5 percent by weight.

7. The process of claim 5 in which said alkali metal hydrosulfite dihydrate is sodium hydrosulfite.

8. A continuous process for the production of high purity solutions of an alkali metal hydrosulfite which comprises:
   (a) producing in a reaction zone an alcohol-free aqueous solution of an alkali metal hydrosulfite containing at least 1% by weight of an alkali metal thiosulfate as an impurity,
   (b) feeding said alcohol-free aqueous solution of an alkali metal hydrosulfite containing an alkali metal thiosulfate as an impurity from said reaction zone to a crystallizing zone,
   (c) producing a slurry of alkali metal hydrosulfite hydrate crystals in the crystallizing zone,
   (d) conveying said slurry of alkali metal hydrosulfite hydrate crystals from said crystallizing zone to a separating zone at a rate greater than one times the volume of the crystallizing zone per hour,
   (e) separating in a separating zone employing a nongravitational separation means a slurry of alkali metal hydrosulfite hydrate crystals from a first mother liquor,
   (f) returning a major portion of said slurry of alkali metal hydrosulfite hydrate crystals to said crystallizing zone, (g) conveying a minor portion of the slurry of alkali metal hydrosulfite hydrate crystals to a concentrating zone to recover a cake of alkali metal hydrosulfite hydrate crystals from a second mother liquor, and (h) admixing the cake of alkali metal hydrosulfite hydrate crystals with water in a dissolving zone to produce a purified solution of an alkali metal hydrosulfite having reduced concentrations of alkali metal thiosulfate of less than 0.7% weight by weight as an impurity.

9. The continuous process of claim 8 in which said first mother liquor from said separating zone is fed to an auxiliary separating zone comprised of a non-gravitational separating means to separate a suspension of alkali metal hydrosulfite hydrate crystals from a third mother liquor.

10. The continuous process of claim 9 in which a portion of said third mother liquor is returned to said reaction zone.

11. The continuous process of claim 10 in which said suspension of alkali metal hydrosulfite hydrate crystals is returned to said crystallizing zone.

12. The continuous process of claim 8 in which said second mother liquor is returned to said crystallizing zone.

13. The continuous process of claim 8 in which a stabilizing amount of a stabilizing agent selected from the group consisting of an alkali metal hydroxide or an alkali metal carbonate is added to said dissolving zone.

14. The continuous process of claim 12 in which said non-gravitational separation means is selected from the group consisting of rotary filters, centrifuges and hydrocyclones.

15. A continuous process for the production of high purity solutions of an alkali metal hydrosulfite which comprises:

(a) feeding an alcohol-free aqueous solution of an alkali metal hydrosulfite containing at least 1% by weight of an alkali metal thiosulfate as an impurity to a crystallizing zone, (b) producing a slurry of alkali metal hydrosulfite hydrate crystals in said crystallizing zone, (c) conveying said slurry of alkali metal hydrosulfite hydrate crystals from said crystallizing zone to a separating zone at a rate greater than one times the volume of the crystallizing zone per hour, (d) separating in a first separating zone employing a non-gravitational separation means a first slurry of alkali metal hydrosulfite hydrate crystals from a first mother liquor, (e) conveying a first portion of said first slurry of alkali metal hydrosulfite hydrate crystals to a concentrating zone to recover a cake of alkali metal hydrosulfite hydrate crystals from a second mother liquor, (f) conveying a second portion of said first slurry of alkali metal hydrosulfite hydrate crystals to a second separating zone employing non-gravitational separation means to separate a second slurry of alkali metal hydrosulfite hydrate crystals having a size larger than about 5 microns from a third mother liquor, (g) conveying said second slurry of alkali metal hydrate crystal to said crystallizing zone, and (h) admixing the cake of alkali metal hydrosulfite hydrate crystals with water in a dissolving zone to produce a purified solution of an alkali metal hydrosulfite having reduced concentrations of said alkali metal thiosulfate of less than 0.7% by weight as an impurity.

16. The process of claim 15 in which said slurry of alkali metal hydrosulfite hydrate crystals from said crystallizing zone contains from about 15 to about 25 percent by weight of crystals.

17. The process of claim 16 in which the residence time in said crystallizing zone for the mother liquor in said slurry of alkali metal hydrosulfite hydrate crystals is less than about 40 minutes.

18. The process of claim 15 in which in said first separating zone the ratios of overflow to underflow are from about 1:1 to about 2:1.

19. The process of claim 18 in which the rate of removal of said slurry of alkali metal hydrosulfite hydrate crystals from said crystallizing zone is at least 3 times the volume of said crystallizing zone.

* * * * *